(No Model.) 4 Sheets—Sheet 1.
I. D. WEAVER.
MACHINE FOR MAKING MATCH SPLINTS.
No. 535,517. Patented Mar. 12, 1895.
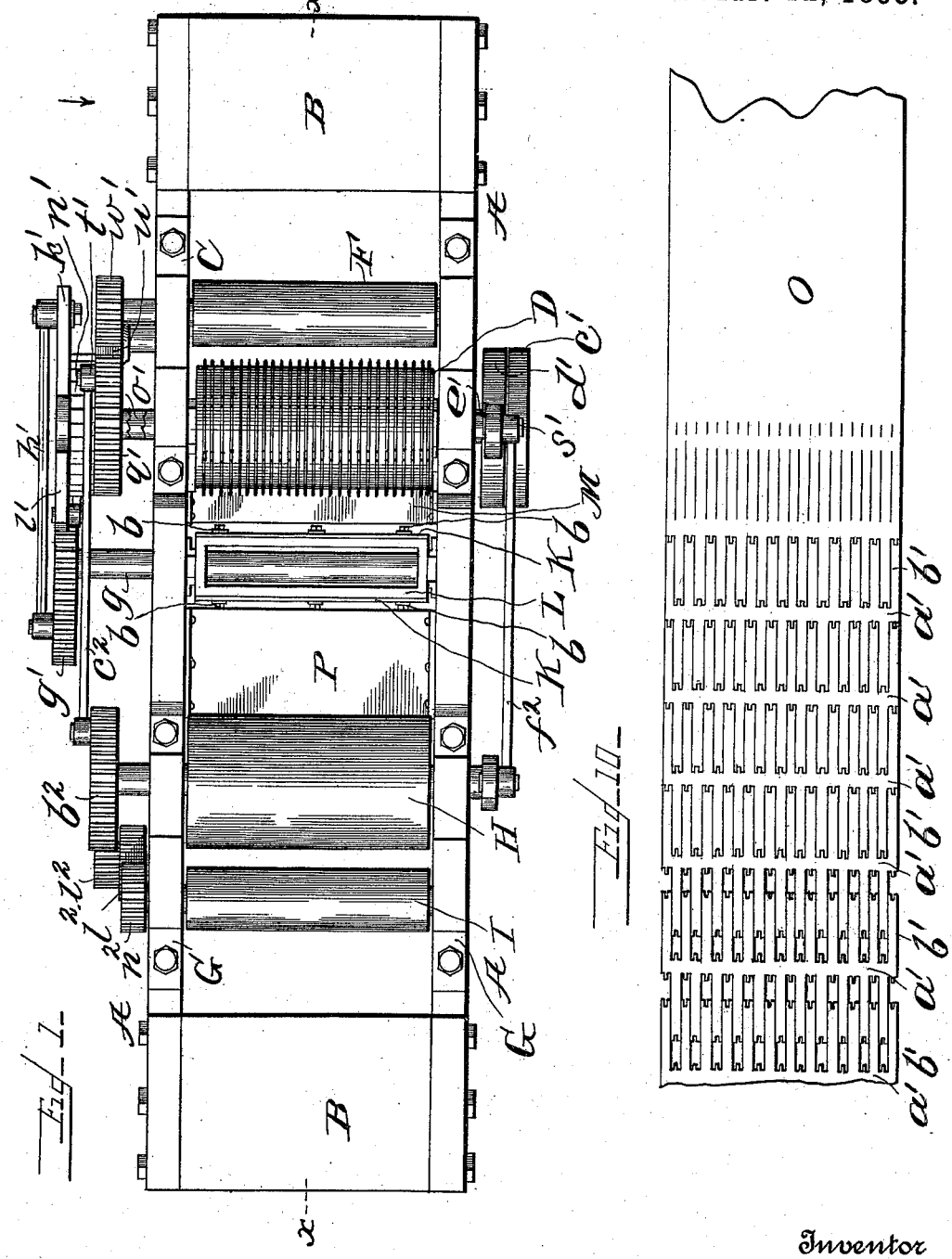

(No Model.) 4 Sheets—Sheet 2.
I. D. WEAVER.
MACHINE FOR MAKING MATCH SPLINTS.
No. 535,517. Patented Mar. 12, 1895.
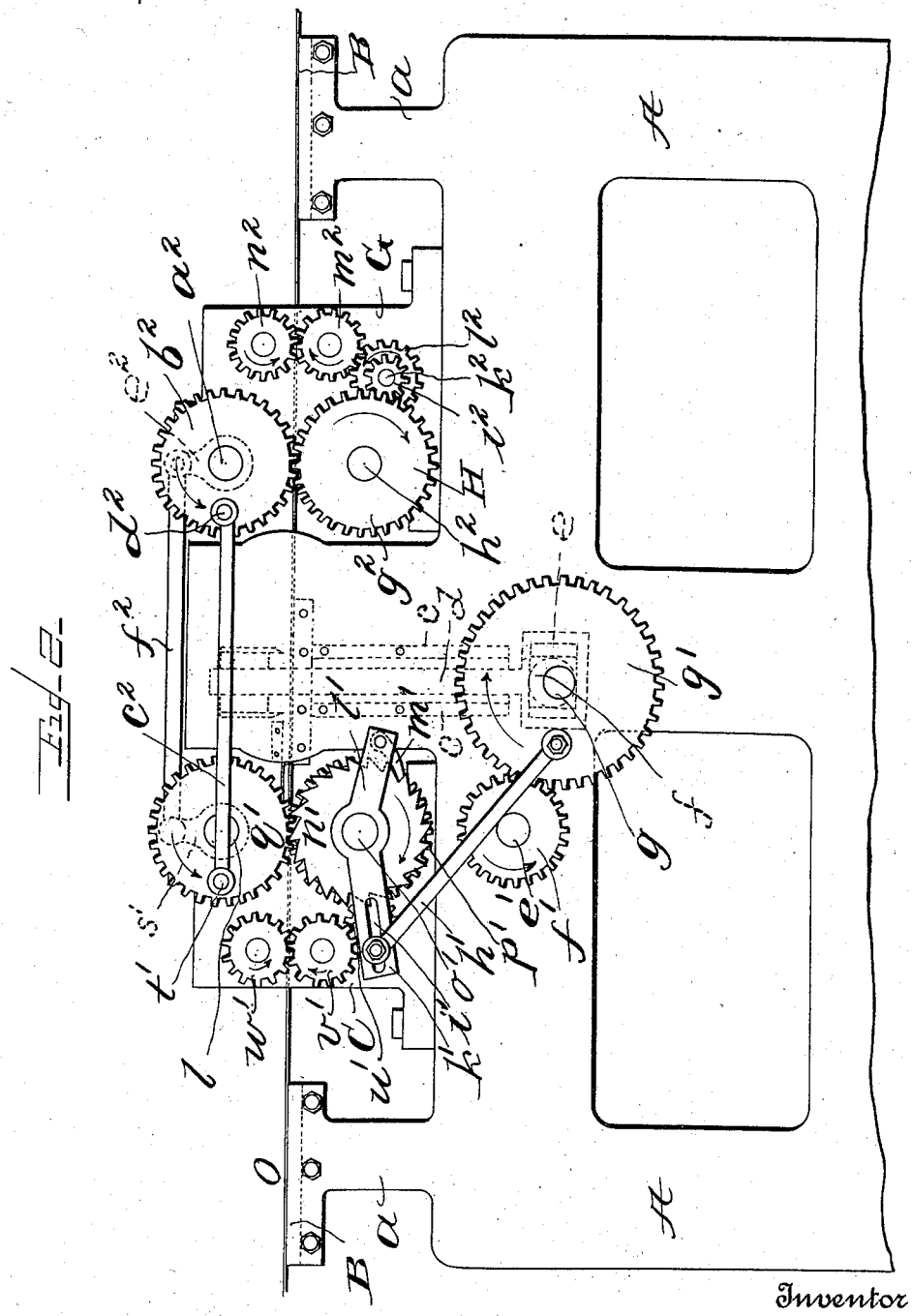
Witnesses
Inventor
Isaac D. Weaver.
Attorney (No Model.) 4 Sheets—Sheet 3.
I. D. WEAVER.
MACHINE FOR MAKING MATCH SPLINTS.
No. 535,517. Patented Mar. 12, 1895.
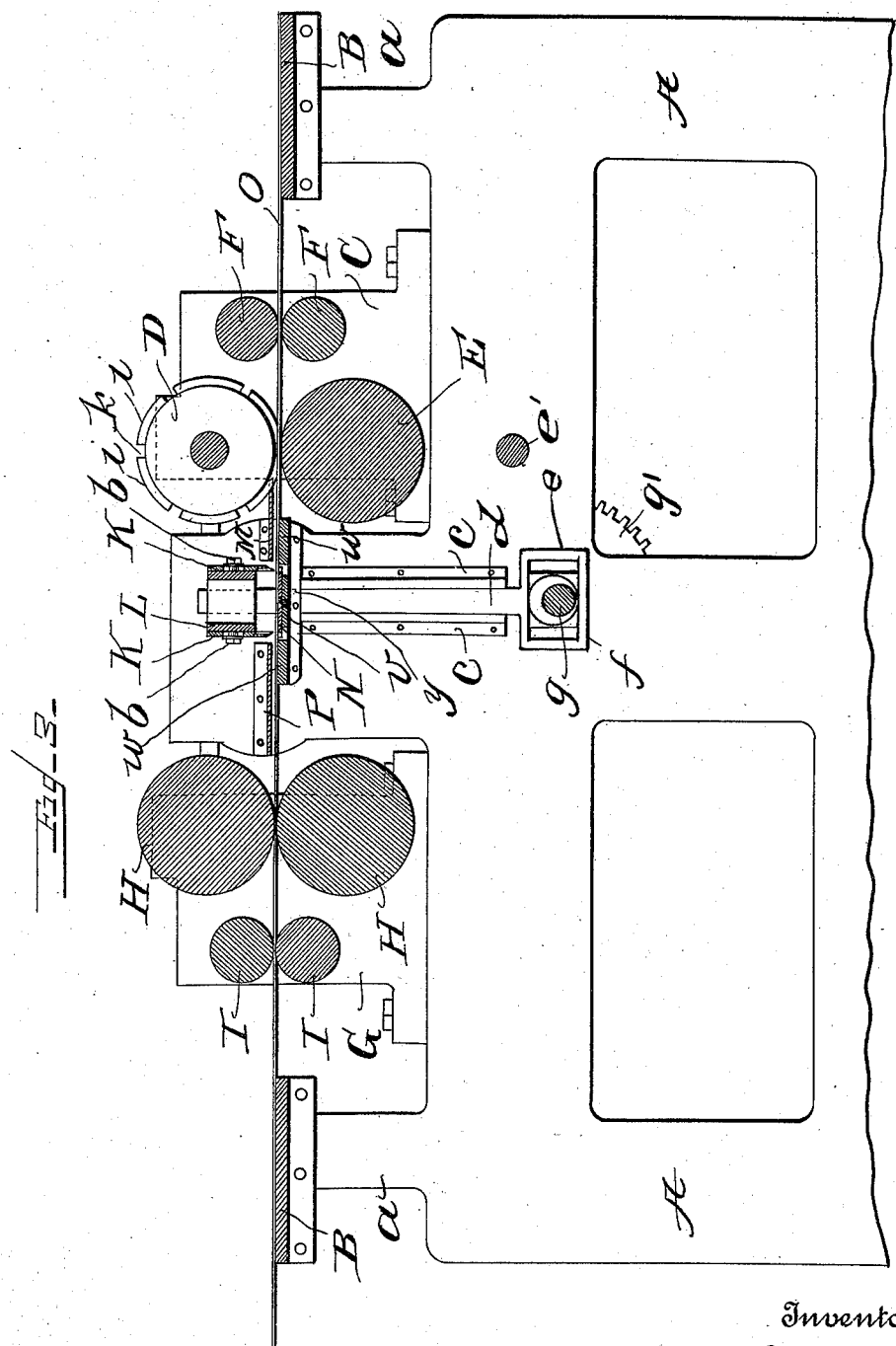
Witnesses
Inventor
Isaac D. Weaver
By D. C. Reinohl
Attorney (No Model.) 4 Sheets—Sheet 4.
I. D. WEAVER.
MACHINE FOR MAKING MATCH SPLINTS.
No. 535,517. Patented Mar. 12, 1895.
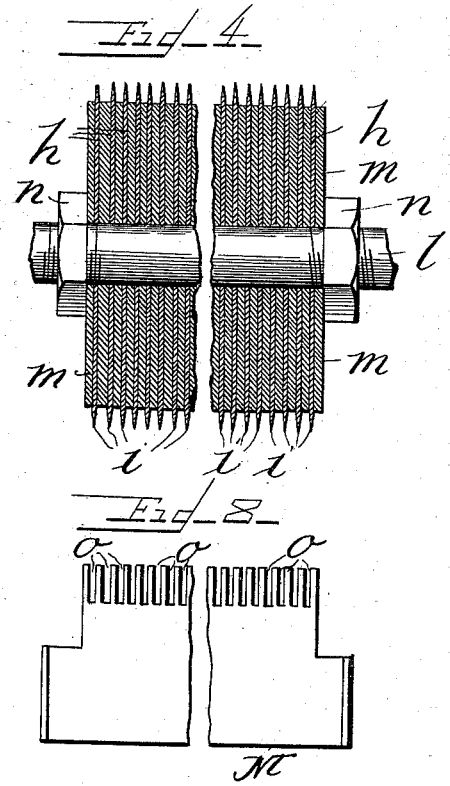
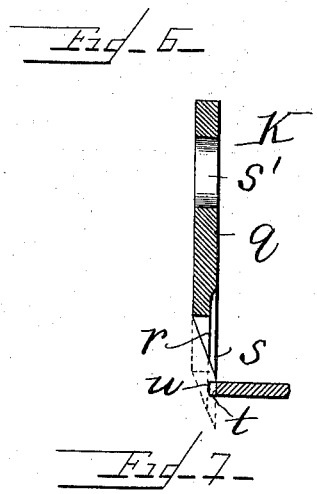
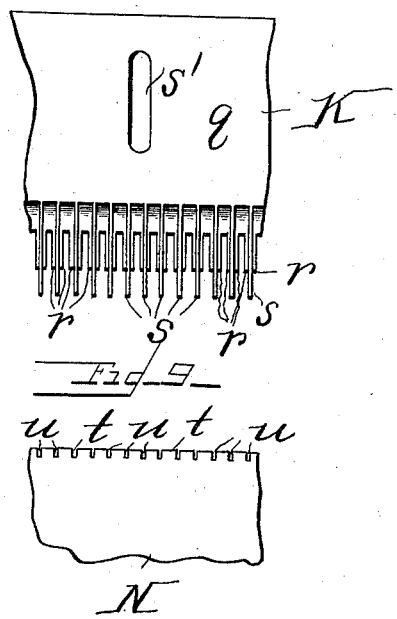
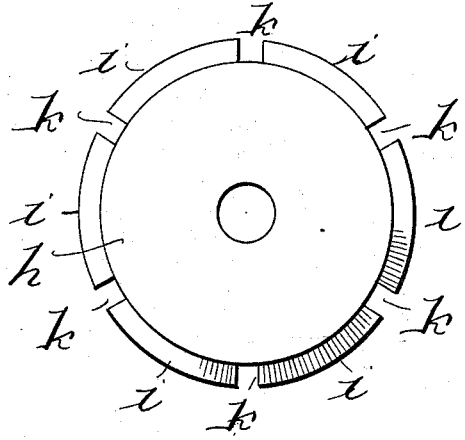
Witnesses
Inventor
Isaac D. Weaver.
By D. C. Reinohl.
Attorney

UNITED STATES PATENT OFFICE.

ISAAC D. WEAVER, OF LEBANON, PENNSYLVANIA, ASSIGNOR TO THE AMERICAN SAFETY-HEAD MATCH COMPANY, OF SAME PLACE.

MACHINE FOR MAKING MATCH-SPLINTS.

SPECIFICATION forming part of Letters Patent No. 535,517, dated March 12, 1895.

Application filed April 20, 1894. Serial No. 508,253. (No model.)

*To all whom it may concern:*

Be it known that I, ISAAC D. WEAVER, a citizen of the United States, residing at Lebanon, in the county of Lebanon and State of Pennsylvania, have invented certain new and useful Improvements in Machines for Making Match-Splints; and I do hereby declare the following to be a full, clear, and exact description of the invention, such as will enable others skilled in the art to which it appertains to make and use the same.

My present invention relates to the art of making match-splints and has for its object certain improvements in the method and means employed for the purpose, as will be fully disclosed in the following specification and claims.

In the accompanying drawings which form part of this specification, Figure 1 represents a top plan view of my improved machine for making match-splints; Fig. 2, a side elevation looking in the direction of the arrow in Fig. 1; Fig. 3, a vertical longitudinal section on the line $x\,x$, Fig. 1; Fig. 4, an elevation of the revoluble cutter for severing the splints longitudinally on an enlarged scale; Fig. 5, a side view of one of the knife or cutting disks detached; Fig. 6, a vertical section of the reciprocating cutter and part of the shearing plate; Fig. 7, a front elevation of a section of the cutter; Fig. 8, a plan view of the cleaner for the revoluble cutter; Fig. 9, a top plan view of a section of the shearing plate, and Fig. 10 a plan view of a sheet or slab of stock showing the result of the operation of the machine in its several stages, beginning with the uncut sheet and ending with cut and partially separated match cards.

Reference being had to the drawings and letters thereon, A, A, indicate the sides of the frame of the machine, at each end of which is a stock supporting plate B, B, transverse of the machine and which plates rest upon vertical arms $a\,a$, which project above the body of the sides of the frame.

C, C, indicate brackets secured to the upper edge of each side A, and in which are supported the revoluble cutter D, the stock supporting roll E, and the feed rolls F, F; and G, G, indicate brackets on the opposite side of the longitudinal center of the machine and secured to the upper edge of the sides A, which support the stock drawing rolls H, H, and the stock separating rolls I, I.

K, K, indicate vertically reciprocating cutters which cross the machine and are secured to a head L in the form of a rectangular box open on its upper and lower sides and to which the cutters are detachably and adjustably secured by bolts $b\,b$, as shown in Figs. 1 and 3. On the inside of each of the sides A, A, of the frame are guide ways $c\,c$ in each of which a vertical arm $d$ attached to the ends of the head L reciprocate, and said arms are provided at their lower ends with heads $e$ which are engaged by eccentrics $f\,f$ on the shaft $g$, which eccentrics impart a reciprocating motion to said arms and to the cutters K, K, as shown in Figs. 2 and 3.

The revoluble cutter D consists of a number of circular disks $h$ having on their circumference knives $i$ of a length equal to the length of a match splint and said knives are separated by spaces $k$ equal in length to the width of the uncut portion or "back-bone" of a match-card. The disks $h$ are assembled on a shaft $l$ with washers $m$ between the disks to separate the knives $i$ a distance equal to the width of a match-splint, and the disks and the washers are securely clamped on the shaft by nuts $n$, $n$ on each end of the cutter.

M indicates a cleaning device consisting of a plate provided with fingers $o$ between which the knives $i$ pass and are engaged by the edges of the fingers to remove any fiber that may adhere to the knives. The cleaner is supported between the sides of the frame by flanges $p\,p$.

The cutters K consist of a plate $q$ having a number of cutting edges or chisels $r\,r$ and $s$ formed thereon the latter being in advance of and longer than the former, and in the operation of the machine, the edges $r\,r$ cut or sever the splint from the body or back-bone of the match-card and the edge $s$ forms the slot in the end of the splint. The cutters are vertically adjustable on the head L by having elongated slots $s'$ in the plate $q$ through which the bolts $b$ pass.

The construction of the cutter K is shown in Figs. 6 and 7 and in the former figure a section of the stock-supporting plate N is shown in position with the cutter K just about to engage the plate, and the edge s to enter the slot T and the edges r r in line with the shearing edges u of the plate in full lines, and the knife down in dotted lines.

The plate N is arranged transversely across the machine and is secured to, a bar v which with the additional stock supporting-plates w w rest upon brackets y as shown in Fig. 3. The sheet or slab O of stock is held down upon the plates w w by the knife cleaning plate M and the plate P, which is also secured to the sides A, A, as shown in Figs. 1 and 3, and as the cutters K descend the edges r r pass the edges u of the plate N and shear off each alternate splint adjacent to the back-bone $a'$ of each match-card $b'$, as shown in Fig. 10, and in which figure the splints are shown partially separated longitudinally at one end, in which condition the match-cards are held together by frictional contact of the sides of the splints and are carried to and placed in the drying kiln in sheets or slabs, which results in great economy in handling the cards.

The driving mechanism comprises pulleys $c'$ $d'$ on the shaft $e'$ on one side of the machine and on the opposite end of said shaft is a gear wheel $f'$ which engages wheel $g'$ on the shaft g and operates the reciprocating cutters K. To the wheel $g'$ is attached a rod or pitman $h'$ which connects with a slot $i'$ in one arm $k'$ of an angular and vibratory bar whose other arm $l'$ supports a pawl $m'$ and engages a ratchet wheel $n'$ on the shaft $o'$, which shaft supports a gear wheel $p'$ which meshes with a wheel $q'$ on shaft l which has at its opposite end a crank $s'$ set at a right angle to the wrist-pin $t'$ on the wheel $q'$. The wheel $p'$ also connects with a pinion $u'$ which engages the wheel $v'$ on the shaft of the lower feed-roll F and said wheel $v'$ engages wheel $w'$ on the shaft of the upper feed-roll F.

On one end of the shaft $a^2$ of the upper drawing roll H is a gear wheel $b^2$ connected to the wheel $q'$ by a rod $c^2$ which engages a pin $d^2$ on the wheel $b^2$ and the crank $s'$ on shaft l is connected to the crank $e^2$ on shaft $a^2$ by a rod $f^2$. The pin $d^2$ and the crank $e^2$ are also set at right angles to each other. The wheel $b^2$ meshes with a wheel $g^2$ on the shaft $h^2$ of the lower drawing-roll H, and the wheel $g^2$ engages a pinion $i^2$ on a shaft $k^2$ which supports a wheel $l^2$ which transmits accelerated motion or a higher degree of speed from the wheel $g^2$ to the separating rolls I, I, through the medium of wheels $m^2$, $n^2$.

By the increased speed applied to the rolls I, I, the splints and cards after having been severed from the sheet of stock are partially separated longitudinally as shown in Fig. 10 of the drawings.

In the operation of the machine the motion of all the feeding and cutting parts is intermittent and is controlled by the ratchet-wheel $n'$ as it is moved by the arm $l'$, pawl $m'$, arm $k'$, rod $h'$ and wheel q, as all the parts after the ratchet wheel $n'$ receive motion therefrom. The cutter D and the feed rolls F, F, are revolved by the ratchet wheel and pawl a sufficient distance for the knives i to cut a row of splints, the rolls and cutter now stand still while the pawl is taking a new bite on the ratchet wheel, and at the same time the eccentrics f f reciprocate the cutters K and sever the splints and form the slot in the end of the splints.

Having thus fully described my invention, what I claim is—

1. The method of making match splints, which consists in slitting a sheet or slab longitudinally and leaving a "back-bone" or uncut portion between the slitted portions of the sheet, and then severing each alternate splint of the sheet at the "back-bone" of the match card.

2. The method of making match splints, which consists in slitting a sheet or slab longitudinally and leaving a "back-bone" or uncut portion between the slitted portions of the sheet and then simultaneously severing the sheet transversely at the "back-bone" of the match card and forming slots in the free ends of the splints.

3. The method of making match splints, which consists in slitting a sheet longitudinally and severing the sheet transversely, and then partially separating the cards of splints longitudinally and leaving the splints interlocked and frictionally held together.

4. In a machine for making match-splints, the combination of a revoluble cutter provided with a plurality of knives separated circumferentially, a pair of vertically reciprocating cutters having a plurality of separated cutting edges and a stock supporting plate provided with slots and shearing edges.

5. In a machine for making match splints, the combination of a revoluble cutter provided with a plurality of knives separated circumferentially by spaces equal in length to the width of the "back-bone" of a match card, and a pair of vertically reciprocating cutters in parallel vertical planes arranged to sever each alternate splint from each side of the "back-bone."

6. In a machine for making match-splints, the combination of a revoluble cutter, a vertically reciprocating cutter an intermittent feed mechanism, and means for partially separating the severed splints longitudinally.

7. In a machine for making match-splints, a revoluble cutter, and a pair of vertically reciprocating cutters having chisels to sever each alternate splint from each side of the "back-bone" of a match card, in combination with a driving shaft which operates the reciprocating cutter, a gear wheel, a ratchet wheel having a rock-arm supporting a pawl a lever connected to a master gear wheel and to said rock-arm and a suitable connection with the shaft of the revoluble cutter.

8. In a machine for making match-splints, a revoluble cutter, and a pair of vertically reciprocating cutters, in combination with suitable mechanism for operating said cutters intermittently, feed and delivery rolls and a pair of splint separating rolls provided with means for accelerating the motion thereof.

9. A sheet or slab cut into a series of match-cards with the splints on both sides of the back-bone of the cards and the cards partially separated longitudinally and held together by frictional contact of the severed splints.

In testimony whereof I affix my signature in presence of two witnesses.

ISAAC D. WEAVER.

Witnesses:
J. F. ELLENBERGER,
L. E. SCHNEPP.